(No Model.) 2 Sheets—Sheet 1.
J. B. SECOR.
Lathe Chuck.
No. 237,614. Patented Feb. 8, 1881.
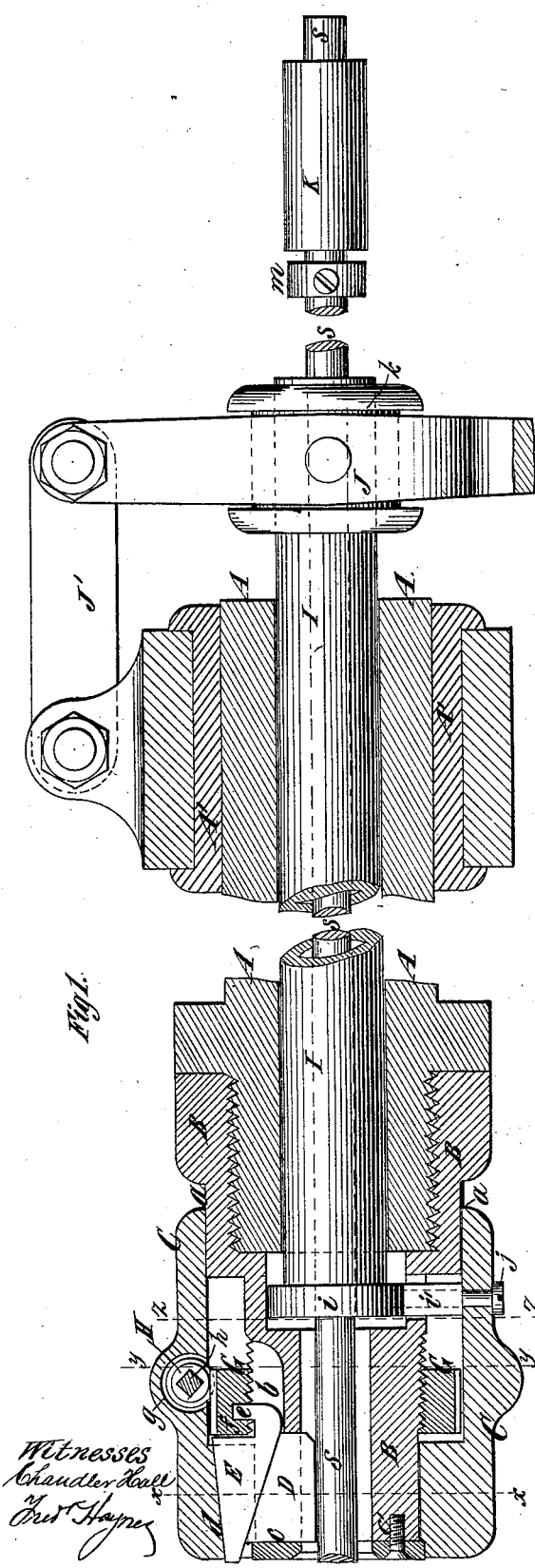
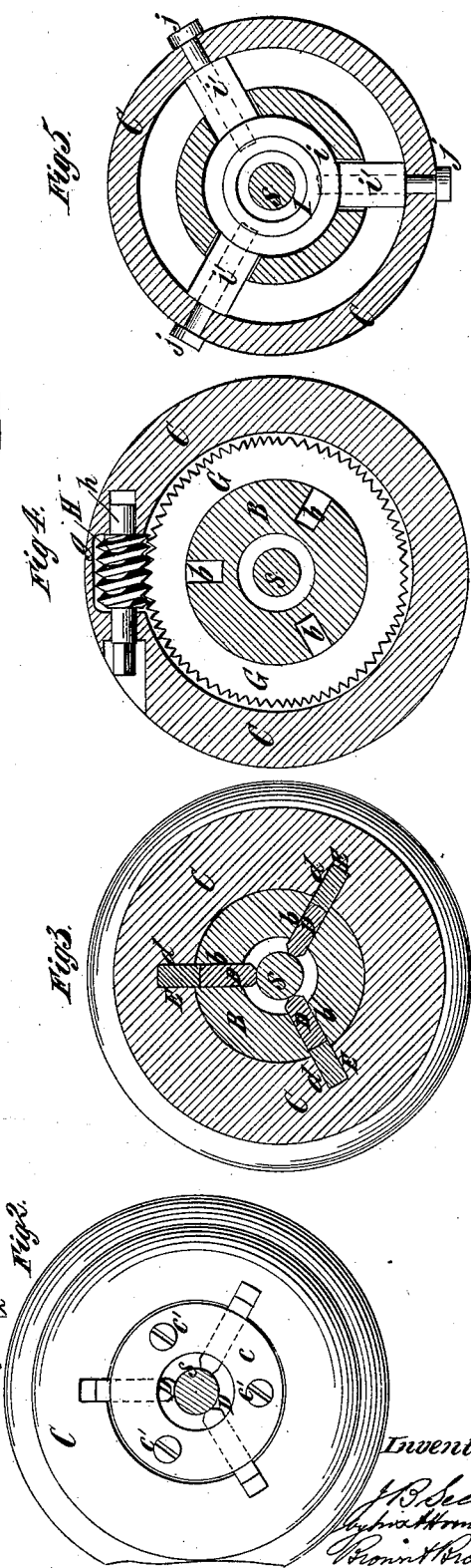

(No Model.) 2 Sheets—Sheet 2.
J. B. SECOR.
Lathe Chuck.
No. 237,614. Patented Feb. 8, 1881.
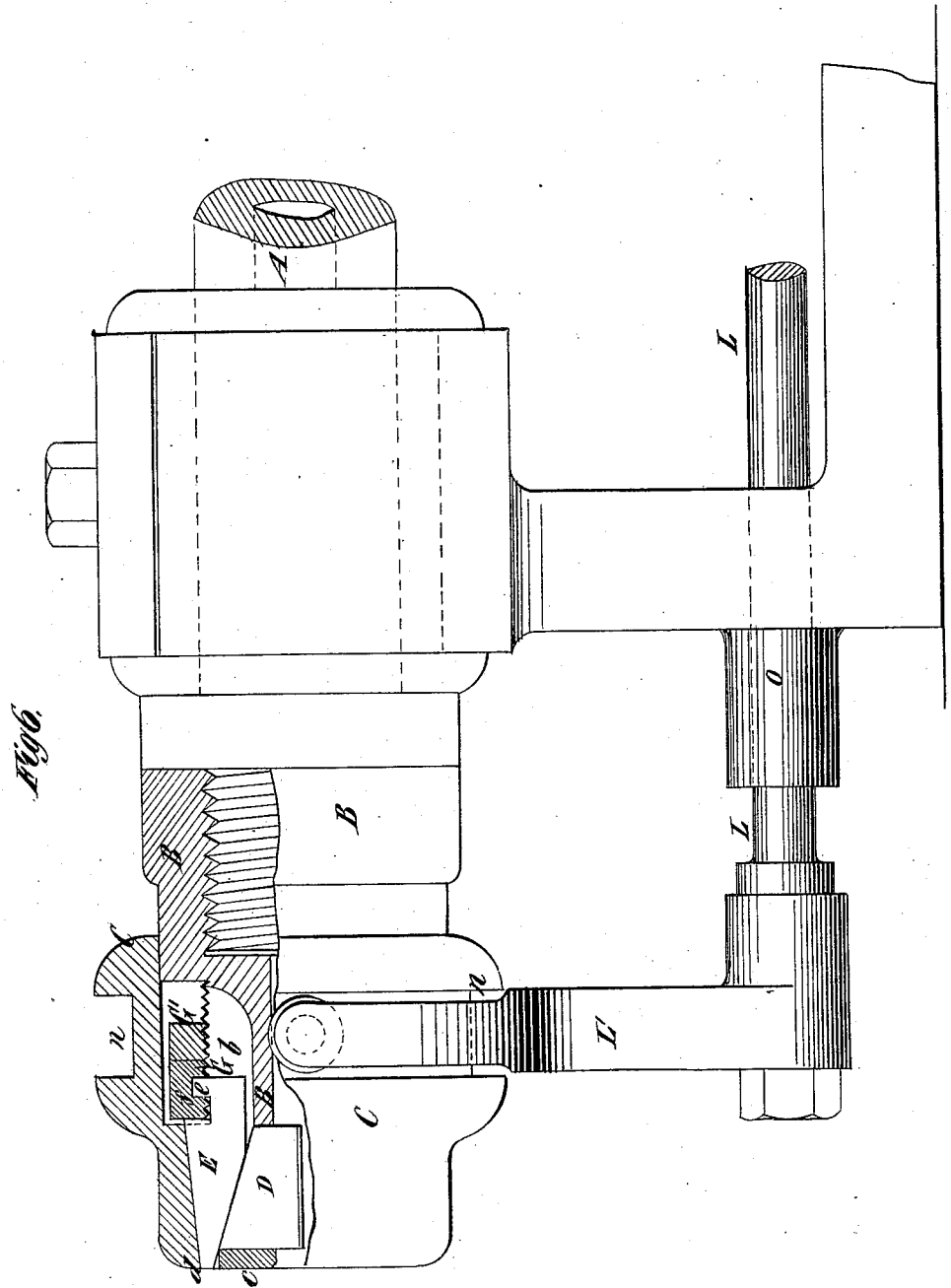
Witnesses:
Chandler Hall
Fred' Haynes
Inventor
Jerome B Secor
by his Attorneys
Brown & Brown

UNITED STATES PATENT OFFICE.

JEROME B. SECOR, OF BRIDGEPORT, CONNECTICUT.

LATHE-CHUCK.

SPECIFICATION forming part of Letters Patent No. 237,614, dated February 8, 1881.

Application filed October 8, 1880. (No model.)

*To all whom it may concern:*

Be it known that I, JEROME B. SECOR, of Bridgeport, in the county of Fairfield and State of Connecticut, have invented certain new and useful Improvements in Chucks, of which the following is a specification.

My invention relates particularly to the chucks employed in automatic screw-machines, and which are adjusted to gripe the wire while screws are being formed, and to release the wire to permit of its being fed forward as each screw is formed and cut off; and the principal object of my invention is to provide for conveniently adjusting the chuck to hold wire of different sizes, and for operating it to gripe or release the wire.

To these ends my invention consists in the combination, in a chuck, of a set of griping-jaws, a set of supplementary jaws bearing upon the outer edges thereof and having themselves inclined outer edges, an outer shell inclined or tapered correspondingly to the outer edges of said supplementary jaws, and mechanism for moving said shell longitudinally to move all said jaws inward. I also make the impinging edges of the griping and supplementary jaws inclined, and provide means for adjusting said supplementary jaws longitudinally relatively to the griping-jaws to adapt the chuck for different sizes of wire. The said supplementary jaws may be adjusted by means of a nut engaging with a screw-thread upon the core of the chuck, and having in it an annular groove, the jaws being provided with fingers or lugs which enter said groove, and provide for moving all of said jaws forward or back, and holding them in any position by turning the said nut. The nut may be constructed with gear-teeth on its periphery, and may be turned by a worm or screw mounted in the outer shell and engaging with said gear-teeth. Any suitable means may be employed for moving the outer shell longitudinally; but as the spindles of the machines to which these chucks are to be applied are hollow, I preferably employ a hollow rod or tube arranged within the spindle, and connected at its inner end to said outer shell, and at its outer end to mechanism—such as a lever—for giving it a longitudinal movement.

My invention further consists in details of construction and combinations of parts, to be hereinafter described.

In the accompanying drawings, Figure 1 represents a longitudinal section through a chuck embodying my invention, the end portions of a spindle to which the same is applied, and a plan view of certain mechanism for operating the chuck to cause it alternately to gripe and release the wire. Fig. 2 represents an end view of the chuck. Fig. 3 represents a transverse section of the chuck upon the dotted line $x\,x$, Fig. 1. Fig. 4 represents a similar section upon the dotted line $y\,y$, Fig. 1. Fig. 5 represents a similar section upon the dotted line $z\,z$, Fig. 1; and Fig. 6 represents a partly-sectional side view of a chuck of slightly modified form, with a portion of a spindle, and a modified form of mechanism for moving the outer shell longitudinally.

Similar letters of reference designate corresponding parts in all the figures.

Referring first to Figs. 1 to 5, inclusive, A represents a hollow spindle, which is adapted to be rotated in suitable bearings in a similar manner to the spindles of ordinary screw-machines. Upon the end of this spindle is an external screw-thread, by means of which the chuck may be secured upon the spindle.

B designates what I term the "core" of my chuck, which is constructed with an internal screw-threaded socket for engaging with the external screw upon the end of the spindle A; and C designates the outer shell of my chuck, which is cylindrical in form and has a bearing upon the core B, at $a$, and also at the end thereof. The shell is adapted to slide for a short distance back and forth longitudinally upon the core, for a purpose hereinafter described. The core B has in its smaller or outer end several radial slots $b$, (here shown as three in number,) and in these are fixed griping-jaws D, which extend the full length of the slots, and are held therein by a plate, $c$, which is secured upon the end of the core by screws $c'$ or other suitable means. The jaws D are thus held against longitudinal movement, but fit loosely enough in their slots to permit them to move inward or outward to contract or expand the space between them.

In the interior of the shell C are formed slots $d$ corresponding in number to and opposite the slots $b$, and extending entirely through the portion of the shell which bears upon the smaller end of the core B.

Within the slots $d$ of the shell C are fitted supplementary jaws E, which bear upon the outer edges of the jaws D, as seen clearly in Fig. 1. The outer edges of the jaws E are slightly inclined and the impinging edges of the two sets of jaws D and E are also inclined, as seen clearly in Fig. 1. The bottoms of the slots $d$ in the shell C, or the ends thereof nearest the exterior of said shell, forming seats for the supplementary jaws E, are inclined correspondingly to the outer edges of said jaws, (see particularly Fig. 1,) and it will therefore be readily understood that by moving the shell longitudinally in one direction the two sets of jaws D and E will be moved inward, causing the former jaws to gripe tightly upon a wire, $s$, and that by moving said shell in the opposite direction the said jaws will be released and the pressure taken off the wire $s$, permitting it to be fed forward. It will be also readily seen that by moving the supplementary jaws E longitudinally relatively to the griping-jaws D, the said jaws may be set or the chuck adjusted to suit wire of different sizes.

I will now proceed to describe the means whereby the supplementary jaws E may be moved relatively to the griping-jaws D to adapt the chuck for wire of different sizes.

The jaws E, which fit in the slots $d$ in the shell C, also project somewhat into the slots $b$ in the core of the chuck, and, as seen clearly in Fig. 1, the portions of the slots $b$ into which the jaws E project are long enough to enable the jaws to have a considerable backward movement. The exterior of the core is provided with an external screw-thread, and G designates a nut, which engages with said screw-thread, and to which the jaws E are connected, so that by turning the nut the jaws may be drawn back to expand the chuck for large wire, or forced forward to contract the chuck for smaller wire. The connection between the jaws E and the nut G must be such that the latter will be free to turn, and though said connection may be of any desirable character, which will admit of this, I prefer to provide the jaws with lugs or fingers $e$, which enter an annular groove, $f$, in the interior of said nut.

In order to enable the nut G to be conveniently turned I may provide its periphery with worm gear-teeth, and when so constructed I employ a worm or screw, H, for imparting motion thereto. The arrangement of this worm or screw, which is somewhat peculiar, is shown most clearly in Fig. 4.

In the interior of the shell C is a cavity or recess, $g$, and the screw or worm H is contained in this recess under cover of the shell, and its shaft or arbor $h$ is mounted in suitable bearings in said shell.

In assembling the parts of my chuck the worm or screw is dropped into the cavity or recess $g$ before the shell is slipped over the core, and the shaft or arbor is then inserted from the outside, its outer end having upon it a square, and a socket-wrench being employed to fit the square.

Turning now to the means employed for moving the shell C longitudinally, I designates a pipe, hollow rod, or tube arranged within the hollow spindle A, and having its inner end rigidly connected to said shell by means of a hub, sleeve, or flange, $i$, which is secured upon its end, and has arms $i'$, (shown as three in number,) which project through openings in the core B, and are made separate from said hub or flange $i$, to permit of the hub or flange being readily inserted in place. These pieces $i'$ are of a length equal to the distance between the interior of the shell C and the hub or flange $i$. After being inserted the shell C is firmly connected to the tube I by screws $j$, which pass through said shell and also through the pieces $i'$ and into the hub or flange $i$. Upon the outer end of the pipe or tube I is a loose sleeve, $k$, which is held against longitudinal movement upon said pipe, but which remains stationary while the said pipe rotates.

J designates a lever forked so as to embrace the sleeve $k$, to which it is connected by pins, and having its fulcrum formed by a link, J', one end of which is pivoted to one of the bearings A', as shown clearly in Fig. 1. By moving said lever by the hand, the pipe or tube I, and with it the shell C of the chuck, is moved longitudinally, and the wire $s$ alternately griped and released as the screws are formed and cut off.

Any suitable kind of feed-motion may be employed, but such mechanism forms no part of my invention. That here shown consists of a guide, K, which is drawn forward, by a weight attached to a cord or chain, as soon as the chuck is operated to release the wire, and which bears against a collar or stop, $m$, detachably secured upon the wire, and thereby feeds the wire forward against a suitable stop.

Although the pipe or tube I, passing through the hollow spindle A, is very desirable as a means of moving the shell C to gripe or release the wire, other mechanism may be easily designed for this purpose, a modified form of such mechanism being shown in Fig. 6.

In Fig. 6 the shell C is represented as constructed with an external groove or annular recess, $n$; and L designates a rod adapted to be moved longitudinally in a suitable guide, $o$, by means of a lever similar to the lever J. The rod L is provided with a fork, L', which projects transversely therefrom and engages the groove or annular recess $n$ in the shell C, thus transmitting the longitudinal movement of the rod L to the shell C.

In order to simplify the construction of the chuck I may dispense with the worm or screw H and its appurtenances, and employ in place of the externally-toothed nut G a plain nut, as shown in Fig. 6. The nut may be constructed with a number of radial holes for the insertion of a bar to turn it, and the shell C have an opening in the side for that purpose. In order to lock the nut upon the core I might employ a jam-nut, G'. (Also shown in Fig. 6.)

It will be seen that by my invention I provide very convenient means for adjusting the chuck for wire of different sizes, and also for operating it to gripe or release the wire.

What I claim as my invention, and desire to secure by Letters Patent, is—

1. The combination, in a chuck, of a set of griping-jaws, a set of supplementary jaws bearing upon the outer edges thereof and having themselves inclined outer edges, an outer shell inclined or tapered correspondingly to the outer edges of said supplementary jaws, and mechanism for moving said shell longitudinally to move all the jaws inward, substantially as specified.

2. The combination, in a chuck, of a set of griping-jaws and a set of supplementary jaws bearing thereon, the impinging edges of both sets of jaws being inclined, and the outer edges of the supplementary jaws being also inclined, means for adjusting said supplementary jaws longitudinally relatively to said griping-jaws, an outer shell internally inclined or tapered correspondingly to the outer edges of said supplementary jaws, and mechanism for moving said shell longitudinally to move all the jaws inward, substantially as specified.

3. The combination, with a hollow lathe-spindle, of a chuck comprising a set of griping-jaws, a set of supplementary jaws bearing upon the outer edges of said griping-jaws and having themselves inclined outer edges, and an outside shell inclined or tapered correspondingly to the outer edges of said supplementary jaws, a hollow rod or tube contained within said spindle and connected at its inner end with said shell, and mechanism connected to the outer end of said hollow rod or tube for moving it longitudinally, substantially as specified.

4. The combination, in a chuck, of a set of griping-jaws, a set of supplementary jaws, bearing upon the outer edges of said griping-jaws and having themselves inclined outer edges, an outer shell inclined or tapered correspondingly to the outer edges of said supplementary jaws, a lever, and a rod forming a connection between said lever and said outer shell for moving the latter longitudinally, substantially as specified.

5. The combination, in a chuck, of an externally screw-threaded core, a set of jaws having inclined outer edges, an outer shell having its interior correspondingly inclined or tapered, mechanism for moving said shell longitudinally, and a nut connected to said jaws and engaging with the screw-thread upon said core, substantially as specified.

6. The combination, in a chuck, of an externally screw-threaded core, a set of jaws having inclined outer edges, an outer shell having its interior correspondingly inclined or tapered, mechanism for moving said shell longitudinally, a nut connected to said jaws and engaging with the screw-thread upon said core, and having a toothed periphery and a worm or screw for turning said nut, substantially as and for the purpose specified.

7. The combination, in a chuck, of an externally screw-threaded core, a set of griping-jaws having inclined outer edges supported therein, a set of supplementary jaws having inclined inner edges bearing upon said griping-jaws, and also having inclined outer edges, an internally inclined or taper outer shell and mechanism for moving it longitudinally, and a nut connected to said supplementary jaws and engaging with the screw-thread upon said core for adjusting the supplementary jaws relatively to the griping-jaws, substantially as specified.

8. The combination, in a chuck, of an externally screw-threaded core, a set of griping-jaws having inclined outer edges supported therein, a set of supplementary jaws having inclined inner edges bearing upon said griping-jaws and also having inclined outer edges, an internally inclined or taper outer shell and mechanism for moving it longitudinally, an externally-toothed nut connected to said supplementary jaws and engaging with the screw-thread upon said core, and a worm or screw mounted in said outer shell and engaging with said nut, substantially as and for the purpose specified.

9. The combination, in a chuck, of a core, B, constructed with slots $b$, and an external screw-thread, a nut, G, engaging with said screw-thread and having in it an annular groove, $f$, griping-jaws D, fitting and secured in said slots $b$, a longitudinally-movable outer shell, C, constructed with slots $d$, and supplementary jaws E, fitting in said slots and having fingers or lips $e$ entering the annular groove in said nut, substantially as specified.

10. The combination of the hollow spindle A, a core, B, constructed with slots $b$, and an external screw-thread, a nut, G, engaging with said screw-thread and having in it an annular groove, $f$, griping-jaws D, fitting and secured in said slots, a longitudinally-movable outer shell, C, constructed with slots $d$, supplementary jaws E, fitting in said slots $d$ and having fingers or lips $e$ entering the annular groove in said nut, and a pipe or tube, I, fitting within said hollow spindle and connected at its end with the said outer shell, C, substantially as specified.

JEROME B. SECOR.

Witnesses:
H. O. LUND,
E. DAVENS.